Nov. 11, 1958  D. B. GENASCI  2,859,725
TRUE VERTICAL INDICATOR
Filed Nov. 22, 1957
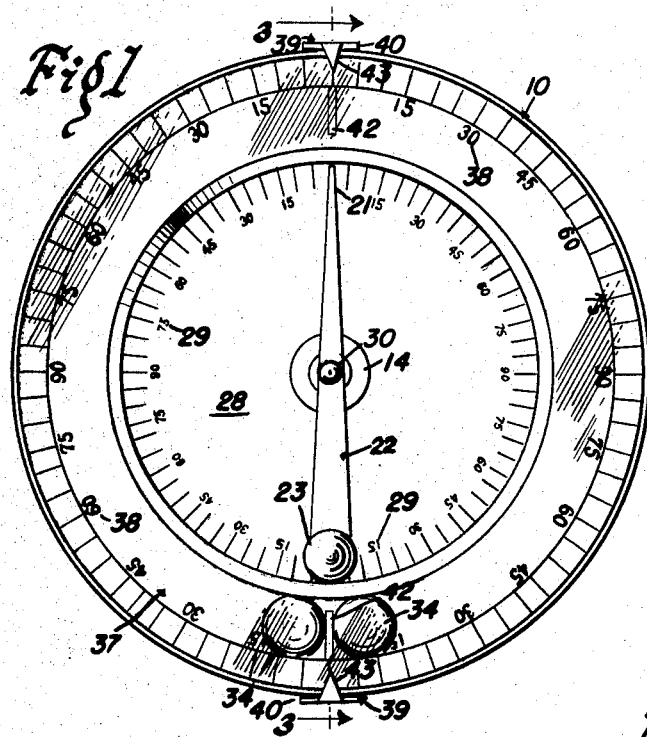
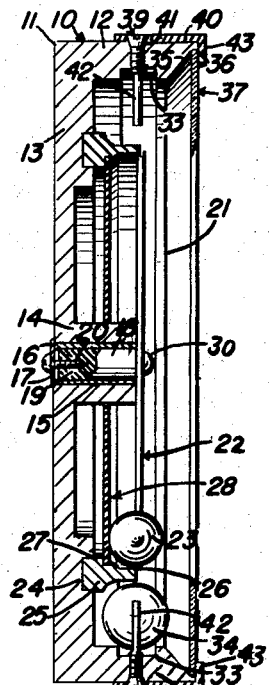
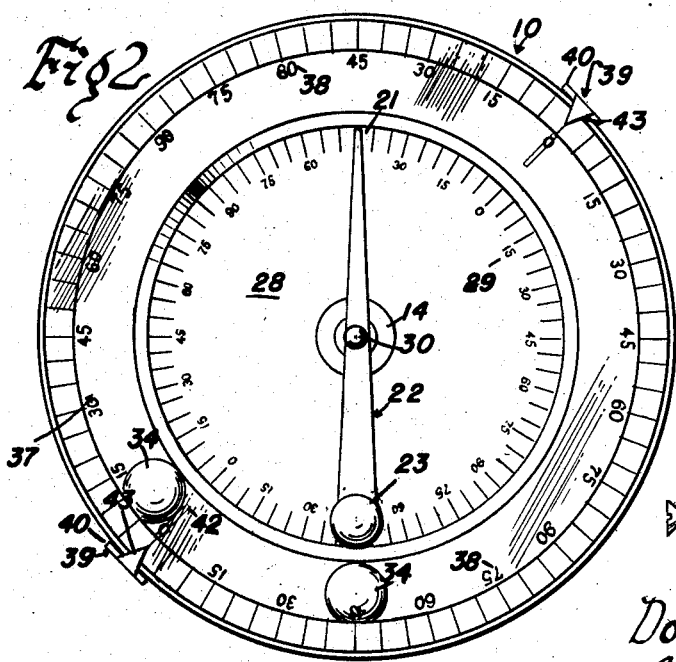
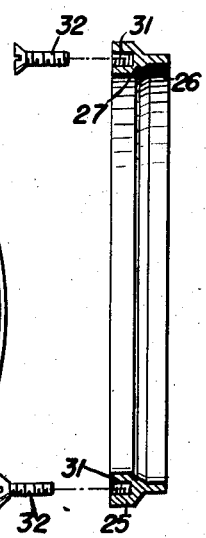
INVENTOR.
Donald B Genasci
BY Victor J. Evans & Co.
ATTORNEYS

United States Patent Office 2,859,725
Patented Nov. 11, 1958

2,859,725

TRUE VERTICAL INDICATOR

Donald B. Genasci, Menlo Park, Calif.

Application November 22, 1957, Serial No. 698,302

3 Claims. (Cl. 116—124)

This invention relates to an instrument, and more particularly to a vertical indicating instrument for an aircraft.

The object of the invention is to provide an indicating instrument which will indicate flight angle from vertical, and wherein the instrument is highly accurate and wherein the instrument does not require the use of electricity nor does it depend upon a gyroscope for its action.

A still further object of the invention is to provide a true vertical indicator which utilizes gravity during its operation, and wherein the indicator will not interfere with any of the other instruments or equipment on an airplane or aircraft, the instrument being provided with scale markings or indicia so that a person will be able to readily ascertain the flight angle which is being undergone by the aircraft.

A further object of the invention is to provide a true vertical indicating instrument which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a front elevational view illustrating the true vertical indicator of the present invention.

Figure 2 is a view similar to Figure 1, but showing the parts in shifted position.

Figure 3 is a sectional view taken on the line 3—3 of Figure 1.

Figure 4 is a sectional view illustrating the ring and showing its securing means.

Referring in detail to the drawings, the numeral 10 indicates the true vertical indicator instrument of the present invention, and the instrument 10 includes a body member 11 which is adapted to be mounted in a suitable location such as in a dashboard or instrument panel of an aircraft. Thus, with the body member 11 mounted in an instrument panel of an aircraft, it will be seen that as the aircraft banks or changes its angular position, the body member 11 will move with the aircraft so that the instrument can be used for providing to the operator of the aircraft or other person, an indication of the angular position of the aircraft.

The body member 11 includes a wall portion 13 which is circular in shape, and the body member 11 further includes an annular rim 12, Figure 3. Extending from the central portion of the wall 13 and secured thereto or formed integral therewith is a hub 14 which is provided with a central bore 15. The numeral 16 indicates a sleeve which is seated in or mounted in the bore 15, and a cap 17 abuts an end of the sleeve 16. Rotatably arranged in the sleeve 16 is a shaft 18, and the shaft 18 is provided with a threaded recess 19 whereby a suitable securing element 20 can be extended through the cap 17 and into engagement with the recess 19.

The instrument 10 of the present invention further includes a movable hand or pointer which is indicated generally by the numeral 22, and one end of the pointer 22 is tapered as at 21, there being a spherical ball piece 23 secured to the other end of the pointer 22. The pointer 22 is connected to the movable shaft 18, and an end piece 30 is arranged adjacent the pointer 22 as shown in the drawings.

The wall portion 13 of the body member 11 is provided with a circular recess 24, and secured in said recess 24 is a ring 25. The ring 25 is provided with an inner circular recess or cut-out 26 which defines a shoulder 27, and a face plate 28 has its outer periphery engaging the shoulder 27. The ball piece 23 is arranged contiguous to the face plate 28, and the face plate 28 is provided with scale markings or indicia 29 thereon. As shown in Figure 4, the ring 25 is provided with threaded apertures or recesses 31 whereby suitable securing elements such as the screws 32 can be extended through the wall portion 13 and into engagement with the recesses 31 for maintaining the ring 25 in its proper position in the instrument.

There is provided in the inner surface of the rim 12, an annular groove 33, and the numeral 34 designates each of a pair of ball members which are mounted for travel in the groove 33. Thus, the ball members 34 can move from the position shown in Figure 1 to the position shown in Figure 2, as for example when the aircraft moves from a horizontal position, as later described in this application.

A portion of the rim 12 of the body member 11 is tapered as at 35, and the tapered portion 35 terminates in an annular recess 36. The numeral 37 indicates a dial plate which has its outer periphery engaging the recess 36, and the dial plate 37 is provided with scale markings or indicia 38 thereon, Figures 1 and 2.

The instrument of the present invention further includes a pair of diametrically opposed brackets which are indicated generally by the numeral 39, and the brackets 39 have the same construction. Each bracket 39 includes a flat section 40 which is arranged contiguous to the outer surface of the rim 12. The numeral 41 indicates securing elements which extend through the flat section 40 and through the rim 12, and the securing elements 41 terminate in inner shanks 42. As shown in Figures 1 and 2, one of the shanks 42 is positioned between the pair of ball members 34, so that as the body member 11 shifts position in response to shifting movement of the aircraft, the adjacent shank 42 will move one of the ball members 34 and this can be used for giving readings on the scales of the instrument. Each bracket 39 further includes a pointed finger 43 which is arranged contiguous to the outer surface of the dial plate 37.

From the foregoing, it is apparent that there has been provided an instrument which is especially suitable for mounting in an aircraft whereby a person will be able to readily ascertain or observe the angular position of the aircraft with respect to the horizontal or vertical. Normally, when the aircraft is in a horizontal position, the ball piece 23 which is secured to the lower end of the pointer 22 will maintain the pointer 22 in the position shown in Figure 1 due to the actions of gravity on the weighted ball piece 23. Furthermore, the ball members 34 will be in the lowermost position contiguous to opposite sides of the shank 42 when the aircraft is in level flight. However, when the aircraft moves from a level position, the body member 11 will move since the body member 11 is adapted to be fixedly anchored in or secured in the instrument panel of the aircraft, and as the body member 11 shifts position, the brackets 39 will also shift position so that the ball members 34 will be separated as shown in Figure 2 and the amount of this separation can be measured by means of the scale markings on the instrument so as to provide an indication of the angular position of the aircraft. At the same time, the tapered end portion 21 of the pointer 22 will coact with the scale markings 29 on the face plate 28 so as to provide a further means of indicating the position of the aircraft. The ball members 34 are adapted to be read in conjunction with the scale markings 38 on the dial plate 37. It is to be noted that the ball members 34 are adapted to travel in the groove 33 of the rim 12. The movable pointer 22 is secured to the shaft 18 which is rotatably arranged in the sleeve 16.

The ring 25 is seated in the recess 24 of the body member, and the screws 32 serve to secure the ring 25 in place. The pair of brackets 40 are secured to the rim 12 of the body member 11 by means of the securing elements 41, and the securing elements 41 also have inner shank portions 42, whereby when the parts move from the position shown in Figure 1 to the position shown in Figure 2, one of the shank portions 42 will serve to separate the ball members 34 as previously described.

The parts can be made of any suitable material and in different shapes or sizes.

As shown in the drawings, the pointer 22 and ball piece 23 travel directly in front of the inner dial or face plate 28 and the ball piece 23 is arranged directly over the ball members 34. The outer dial plate 37 encloses the various parts of the instrument.

When the two balls 34 are separated as shown in Figure 2, it is an indication that the aircraft is not in a level position and this provides an instant indicator which is visually observable by the user of the device. The pointer 22 serves to give an accurate reading of the position of the aircraft.

With the present invention, the indicator does not use a gyroscope and the instrument utilizes a minimum number of moving parts. Furthermore, the device is a double indicator so that a means is provided for accurately checking the accuracy of the device. No electrical connections are required and the device does not depend on a motor for operation thereof. The instrument is an earth gravity type and will operate accurately within the range of the earth's gravity and the indicator will not interfere with radio or electronic equipment which is present in the aircraft.

The inner unit comprises a steel ball 23 which is suspended on the pointer 22 and the shaft assembly previously described may be mounted on a spring bearing or else it can be mounted on a jewel assembly or the like. The needle 43 reads on a graduated scale 29 from 0 degrees 180 degrees either right or left according to the tilt of the aircraft to another pin or needle 43 at the 180 degree point. The scales 29 and 38 may be colored in green numbers from 0 degrees to 90 degrees right or left to indicate safe flight, and may read from 0 degrees to 90 degrees in other red numbers to indicate upside down flight or danger. Furthermore, fog or various adverse weather conditions do not affect the operation of the instrument.

If desired, the inner scale and needle point can be coated with luminous paint so that the device can be read in the dark. The instrument will also indicate angle of climb of the plane or angle of dive. When the aircraft is in level flight, all three steel balls 23 and 34 are at the bottom of the scale at 0 degrees and the needle 22 of the inner instrument points to 0 degrees on the inner scale 29. The instrument can be made of aluminum, and inserted steel ball rails can be provided. The inner dial may be of black plastic material with white numbers engraved thereon. The outer dial 37 serves as a face for the instrument and is clear plastic with green numbers engraved on the safe flight range and red numbers engraved for the danger range.

The body member 11 serves as the main body of the instrument and also serves as a bearing support for the movable balls 34. There is further provided a ball guide for keeping the balls 34 running true in the groove 33, and the balls 34 will provide a measurement in degrees, when the balls 34 are separated as shown in Figure 2. A spring bearing can be used for supporting the shaft 18. The clips 39 help retain the face plate 37 in place.

The instrument can be used for indicating true vertical safe flight as for example when the green band part of a scale is indicated, and the instrument can also be used for indicating different degrees of bank as for example a 15 degree right bank or safe flight, and a red band or portion of the scale can be used for indicating upside down vertical flight or the like.

Minor changes in shape, size and rearrangement of details coming within the field of invention claimed may be resorted to in actual practice, if desired.

I claim:

1. In an indicator, a body member including a circular rim and a circular wall portion, a centrally arranged hub extending outwardly from said wall portion and said hub being provided with a bore therein, a sleeve mounted in said bore, a shaft rotatably arranged in said bore and said shaft being provided with a threaded recess, a cap arranged contiguous to an end of said sleeve, a securing element extending through said cap and engaging the threaded recess in said shaft, a movable pointer connected to said shaft and one end of said pointer being tapered, a ball piece secured at the other end of said pointer, there being a circular recess in the wall portion of said body member, a ring having a portion thereof seated in said recess, said ring having an inner cut-out defining a shoulder, a face plate engaging said shoulder, said face plate having its outer periphery seated in the cut-out in said ring, said face plate having scale markings thereon, there being an annular groove in the inner portion of the rim of said body member, a pair of ball members movably mounted in said groove, a portion of the rim of the body member being tapered and terminating in an annular recess, a dial plate having its outer periphery engaged in said last named annular recess, said dial plate having scale markings thereon, and a pair of diametrically opposed brackets each having a flat section arranged contiguous to the outer surface of the rim of the body member, securing elements extending through the flat sections of said brackets and through said rim and said last named securing elements terminating in inner shanks, said ball members being arranged on opposite sides of a shank, each bracket further including a pointed finger arranged contiguous to the outer surface of said dial plate.

2. In an indicator, a circular body member, a centrally arranged hub in said body member having a bore therein, a sleeve mounted in said bore, a shaft rotatably arranged in said bore, a cap arranged contiguous to an end of said sleeve, a securing element extending through said cap and engaging said shaft, a movable pointer connected to said shaft, a ball piece secured at the end of said pointer, a ring having a portion thereof seated in said body member, a face plate engaging said ring, said face plate having scale markings thereon, a pair of ball members movably mounted in said body member, a dial plate mounted in said body member, said dial plate having scale markings thereon, and a pair of diametrically opposed brackets mounted in said body member, securing elements extending through said brackets, said ball members being arranged on opposite sides of said securing elements, each bracket further including a pointed finger arranged contiguous to the outer surface of said dial plate.

3. In an indicator, a body member, a shaft rotatably arranged in said body member, a movable pointer connected to said shaft, a ball piece secured at the end of said pointer, a face plate mounted in said body member, said face plate having scale markings thereon, a pair of ball members movably mounted in said body member, a dial plate mounted in said body member, said dial plate having scale markings thereon, and a pair of diametrically opposed brackets mounted in said body member, securing elements extending through said brackets, said ball members being arranged on opposite sides of said securing elements, each bracket further including a pointed finger arranged contiguous to the outer surface of said dial plate.

References Cited in the file of this patent
UNITED STATES PATENTS

| | | |
|---|---|---|
| 559,090 | West | Apr. 28, 1896 |
| 1,302,580 | Nelson | May 6, 1919 |